(12) United States Patent
Yasuda et al.

(10) Patent No.: US 8,690,350 B2
(45) Date of Patent: Apr. 8, 2014

(54) IMAGE DISPLAY APPARATUS AND INFORMATION PROCESSING APPARATUS HAVING THE SAME AND METHOD OF CONTROLLING IMAGE DISPLAY APPARATUS

(75) Inventors: Kazutaka Yasuda, Kumamoto (JP); Masakazu Furumura, Saga (JP)

(73) Assignee: Panasonic Corporation, Osaka (JP)

( * ) Notice: Subject to any disclaimer, the term of this patent is extended or adjusted under 35 U.S.C. 154(b) by 126 days.

(21) Appl. No.: 13/304,782

(22) Filed: Nov. 28, 2011

(65) Prior Publication Data

US 2012/0140188 A1 Jun. 7, 2012

(30) Foreign Application Priority Data

Dec. 2, 2010 (JP) ................................. 2010-269619

(51) Int. Cl.
*G03B 21/22* (2006.01)
(52) U.S. Cl.
USPC ................... 353/71; 353/69; 353/70; 353/99; 353/119; 353/122; 348/208.4; 348/745
(58) Field of Classification Search
USPC ......... 353/31, 46, 69–71, 79, 98, 88, 99, 119, 353/122; 348/207.99, 208.4, 744–747; 362/227, 231, 253, 259; 349/5, 7–9, 10
See application file for complete search history.

(56) References Cited

U.S. PATENT DOCUMENTS

| | | | | |
|---|---|---|---|---|
| 6,499,847 B1 * | 12/2002 | Yoneno | ............................ | 353/70 |
| 8,104,899 B2 * | 1/2012 | Ha et al. | ........................... | 353/69 |
| 8,269,902 B2 * | 9/2012 | Plut | ................................ | 348/745 |
| 2005/0110964 A1 * | 5/2005 | Bell et al. | ........................ | 353/122 |
| 2008/0068566 A1 * | 3/2008 | Denoue et al. | ................. | 353/122 |
| 2008/0218641 A1 * | 9/2008 | Kjeldsen et al. | ............... | 348/746 |
| 2009/0237620 A1 * | 9/2009 | Yamamoto et al. | ............. | 353/69 |
| 2010/0073643 A1 | 3/2010 | Nasukawa et al. | | |
| 2010/0130259 A1 * | 5/2010 | Lee | ............................... | 455/566 |

FOREIGN PATENT DOCUMENTS

| | | |
|---|---|---|
| JP | 9-270979 | 10/1997 |
| JP | 2006-014233 | 1/2006 |
| JP | 2007-271912 | 10/2007 |
| JP | 2010-028412 | 2/2010 |
| JP | 2010-078634 | 4/2010 |

* cited by examiner

*Primary Examiner* — Sultan Chowdhury
(74) *Attorney, Agent, or Firm* — Greenblum & Bernstein, P.L.C.

(57) ABSTRACT

An image display apparatus detects a projection angle of a projection unit that projects a screen image on a screen and is capable of vertically changing the projection angle, and corrects trapezoidal distortion of the screen image according to the projection angle. The image display apparatus changes the amount and direction of trapezoidal distortion correction based on the projection angle. The image display apparatus also determines whether a projection mode is projection upward to a wall or projection to a ceiling and changes the direction of trapezoidal distortion correction for projection upward to the wall and projection to the ceiling. Specifically, for projection upward to the wall, a correction factor is positive and an upper edge portion of the screen image is compressed for correction; and for projection to the ceiling, a correction factor is negative and a lower edge portion of the screen image is compressed for correction.

8 Claims, 18 Drawing Sheets

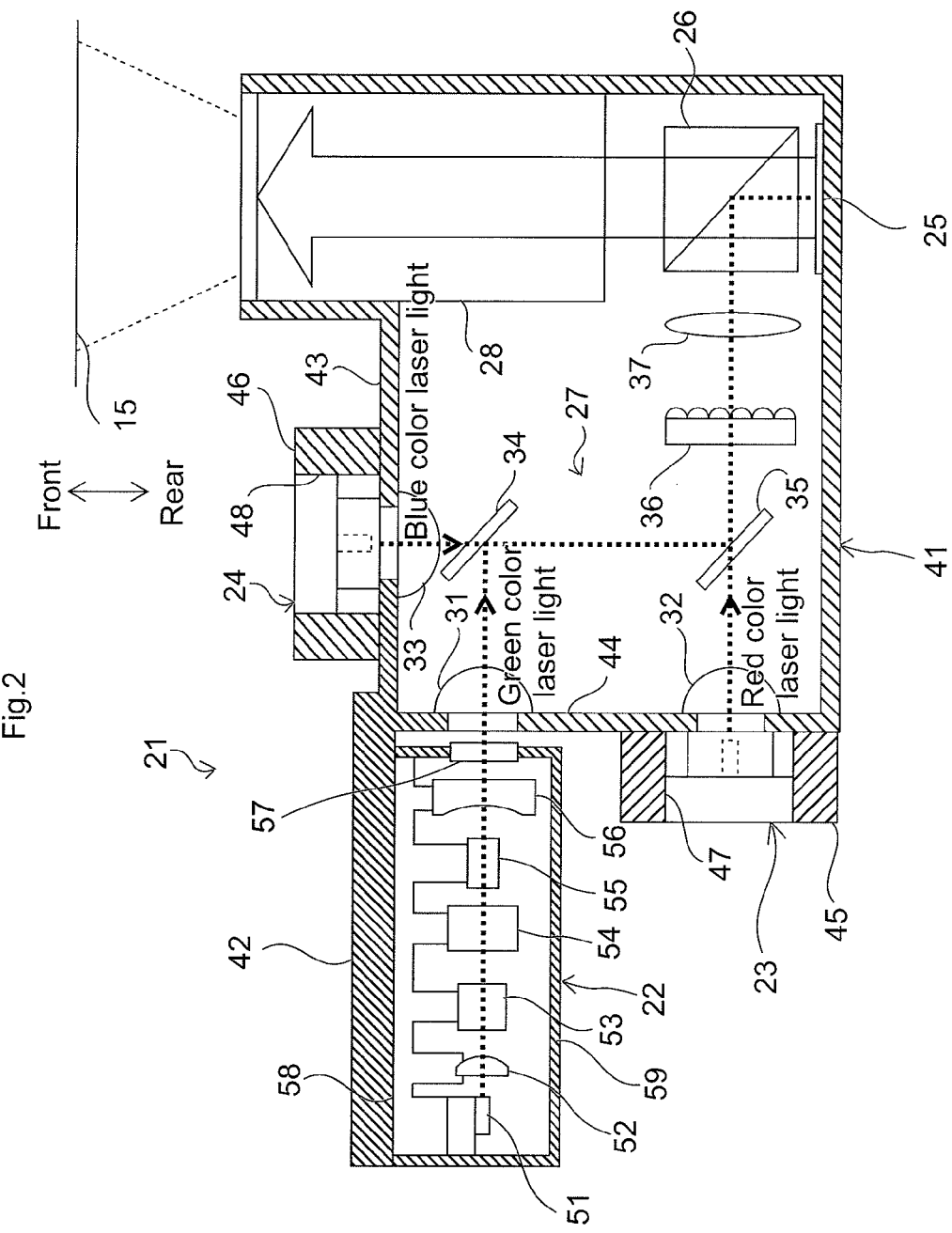

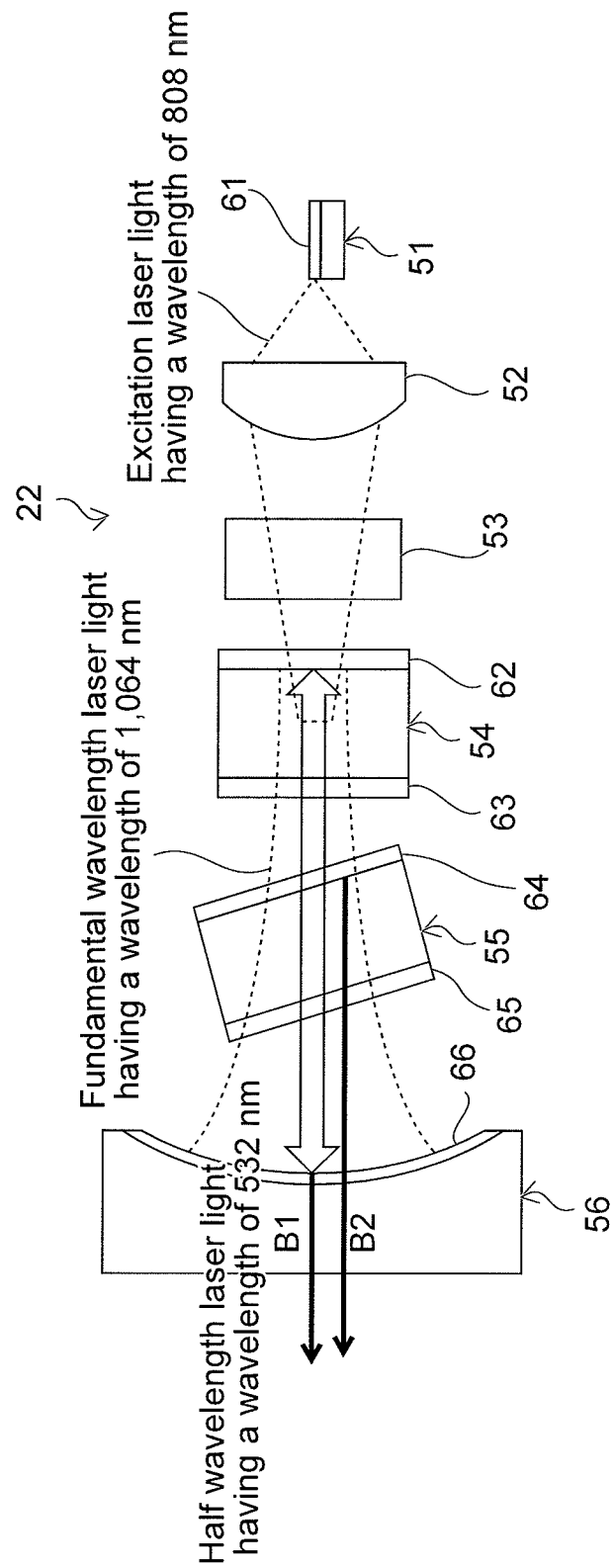

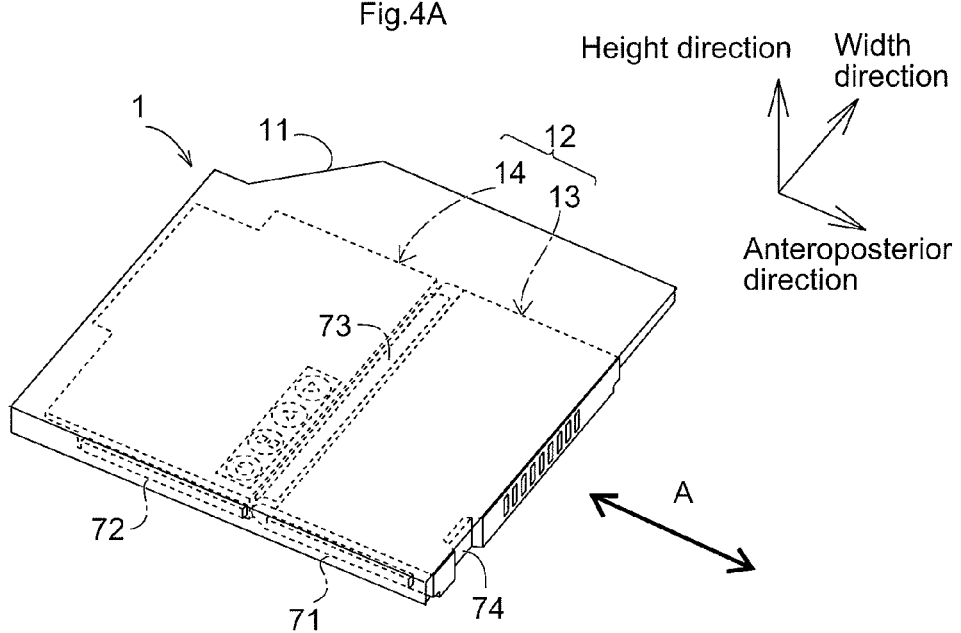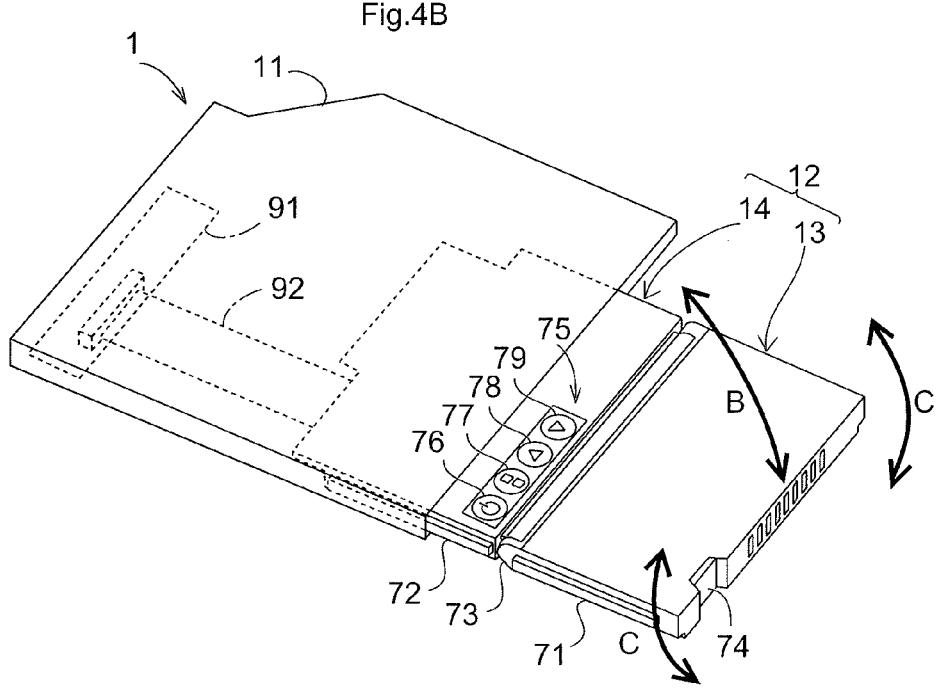

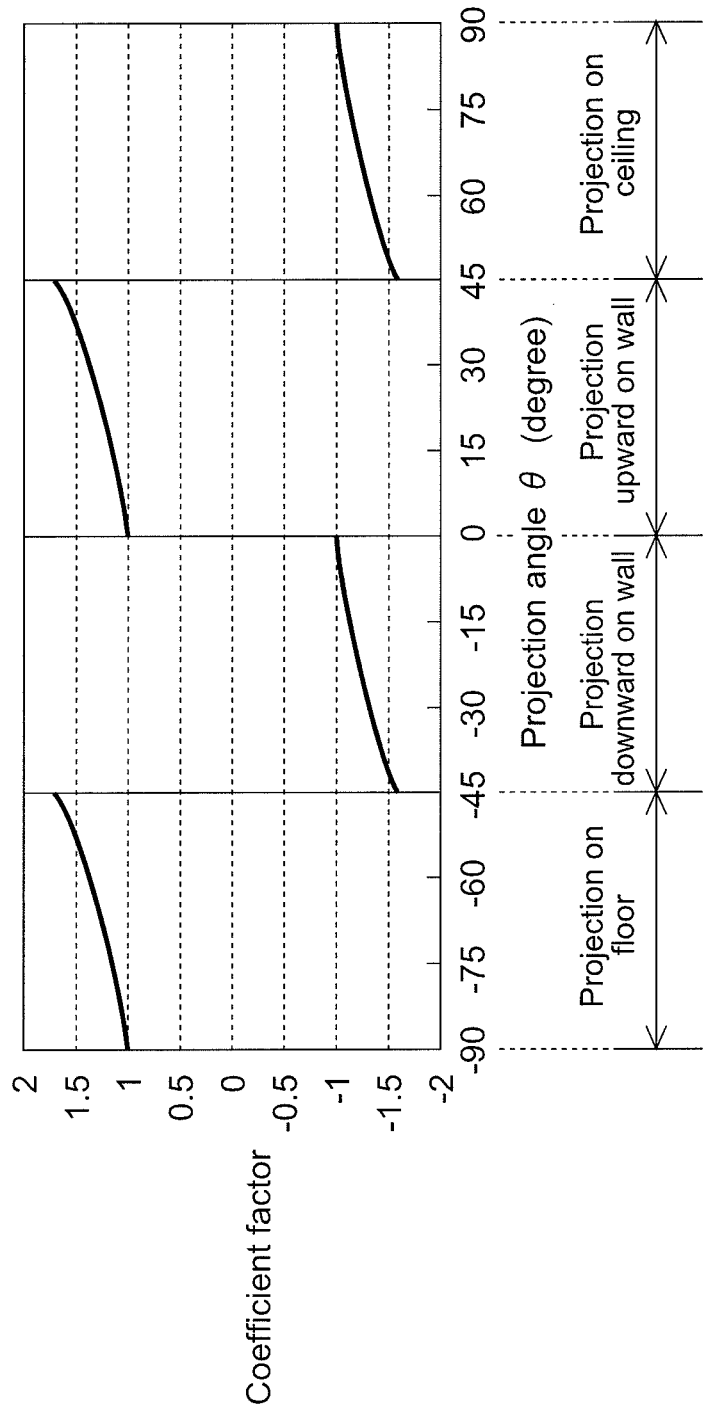

Projection upward on wall / floor
Output screen image

Projection on ceiling / upward on wall
Output screen image

Projected screen image

Projected screen image

Output screen image after correction

Output screen image after correction

Projected screen image after correction

Projected screen image after correction

Projection on ceiling
Original screen image

Projection on floor
Original screen image

Screen image after trapezoidal distortion correction

Screen image after trapezoidal distortion correction

Reversed screen image

Reversed screen image

Projected screen image after correction

Projected screen image after correction

Projection upward on wall
Output screen image

Projection on ceiling
Output screen image

Projected screen image

Projected screen image

Output screen image after correction

Output screen image after correction

Projected screen image after correction

Projected screen image after correction

IMAGE DISPLAY APPARATUS AND INFORMATION PROCESSING APPARATUS HAVING THE SAME AND METHOD OF CONTROLLING IMAGE DISPLAY APPARATUS

CROSS-REFERENCE TO RELATED APPLICATIONS

The present application claims priority under 35 U.S.C. §119 of Japanese Application No. 2010-269619 filed on Dec. 2, 2010, the disclosure of which is expressly incorporated by reference herein in its entirety.

BACKGROUND OF THE INVENTION

1. Field of the Invention

The present invention relates to an image display apparatus having a function to correct trapezoidal distortion caused when a screen image is projected on a screen from an angle, an information processing apparatus having the image display apparatus, and a method of controlling the image display apparatus.

2. Description of Related Art

An image display apparatus that projects a screen image on a screen has no problem if the screen image is projected on the screen straight from a side of the apparatus. In the case where the screen image is projected on the screen from an angle, however, what is commonly called trapezoidal distortion occurs, in which an rectangular output screen image is distorted into a trapezoidal shape. Then, trapezoidal distortion correction (Keystone correction) is performed to convert the rectangular output screen image into a trapezoidal shape in the reverse direction of the distorted trapezoidal shape of the screen image projected on the screen. Thus, a non-distorted rectangular screen image can be displayed on the screen.

Such trapezoidal distortion correction may be configured such that a user manually makes an adjustment while viewing the screen image on the screen. As described in Japanese Patent Application Publication No. 1997-270979 or No. 2006-14233, for example, due to cumbersomeness in adjustment, a technology is known that automatically corrects trapezoidal distortion, thus eliminating manual adjustment by a user. Such a technology detects with a sensor an installation angle at which an image display apparatus itself is installed in a tilted state and corrects trapezoidal distortion in accordance with the installation angle.

In the conventional technology, the image display apparatus itself is installed in a tilted state. As shown in FIGS. 16A and 16B, however, a projection unit 112 of an image display apparatus 111 is rotatably provided in a main body 113 so as to substantially change a projection angle. Then, a screen image can be projected on a wall 114 as a screen as shown in FIG. 16A and on a ceiling 115 as a screen as shown in FIG. 16B, thus enhancing usability.

The conventional technology corrects trapezoidal distortion based on a case where a screen image is projected obliquely upward, similar to the case shown in FIG. 16A. As shown in 17, a correction factor is set to be greater as the projection angle increases. The projection angle θ is a tilt angle of an optical axis of projected light relative to the horizontal direction. The correction factor represents a ratio of an upper edge and a lower edge of a screen image displayed in a trapezoidal shape on the screen.

In the case of projection upward to the wall shown in FIG. 16A, the distance to the wall 114 is greater on the upper edge of the screen image. When a rectangular output screen image shown in FIG. 18A-1 is projected on the wall 114, the screen image projected on the wall 114 has a trapezoidal shape having the upper edge greater than the lower edge as shown in 18B-1. In correction of trapezoidal distortion using the correction factor shown in FIG. 17, the upper edge portion of the screen image is compressed as shown in FIG. 18C-1, and thereby the screen image on the wall 114 is displayed in a non-distorted rectangular shape having the upper edge and the lower edge in the same length as shown in FIG. 18D-1.

In the case of projection on the ceiling shown in FIG. 16B, meanwhile, the distance to the ceiling 115 is greater on the lower edge of the screen image. When a rectangular output screen image shown in FIG. 18A-2 is projected on the ceiling 115, the screen image projected on the ceiling 115 has a trapezoidal shape having the lower edge greater than the upper edge as shown in 18B-2, opposite to the case of projection upward to the wall. In correction of trapezoidal distortion similar to the case of projection upward to the wall, the upper edge portion of the screen image is compressed as shown in FIG. 18C-2. Since the correction expands the distortion of the projected screen image, the screen image projected on the ceiling 115 is substantially distorted as shown in FIG. 18D-2, substantially falling short of the concept of automated screen image adjustment.

SUMMARY OF THE INVENTION

In view of the circumstances above, a main advantage of the present invention is to provide an image display apparatus configured to automatically correct trapezoidal distortion and appropriately display a screen image even in a case of projection on the ceiling as a screen.

An image display apparatus of the present invention includes a projection unit projecting a screen image on a screen and capable of vertically changing a projection angle; a projection angle detector detecting the projection angle of the projection unit; and a screen image corrector correcting trapezoidal distortion of a screen image according to the projection angle detected by the projection angle detector. The screen image corrector changes an amount of trapezoidal distortion correction according to the projection angle. The screen image corrector determines whether a projection mode is projection upward to a wall or projection to a ceiling based on the projection angle and, based on the projection mode, changes a direction of trapezoidal distortion correction.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 2 schematically illustrates a configuration of an optical engine installed in an optical engine unit;

FIG. 3 is a schematic view illustrating a state of laser light in a green color laser light source apparatus;

FIGS. 4A and 4B are each a perspective view illustrating the image display apparatus;

FIG. 11 illustrates a relationship between a projection angle and a correction factor according to the present invention;

FIGS. 12A-1, 12B-1, 12C-1, and 12D-1 each illustrate a screen image projected upward to the wall or projected to the floor;

FIGS. 12A-2, 12B-2, 12C-2, and 12D-2 each illustrate a screen image projected to the ceiling or projected downward to the wall;

FIGS. 15A-1, 15B-1, 15C-1, and 15D-1 each illustrate a screen image projected to the ceiling;

FIGS. 15A-2, 15B-2, 15C-2, and 15D-2 each illustrate a screen image projected to the floor;

FIGS. 18A-1, 18B-1, 18C-1, and 18D-1 each illustrate a screen image projected upward to the wall; and FIGS. 18A-2, 18B-2, 18C-2, and 18D-2 illustrate a screen image projected to the ceiling.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
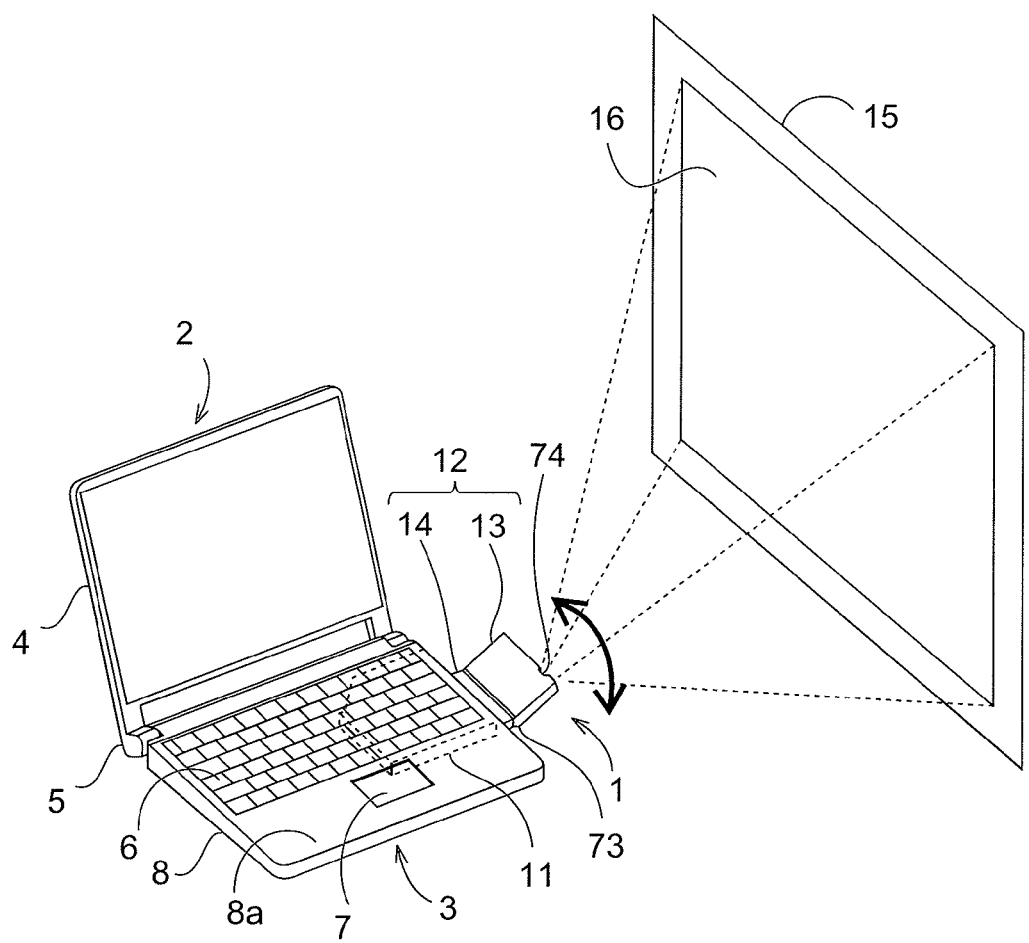
FIG. 1 is a perspective view illustrating an example in which an image display apparatus of the present invention is installed in a portable information processing apparatus.

FIG. 1 is a perspective view illustrating an example in which an image display apparatus 1 of the present invention is installed in a portable information processing apparatus 2. The portable information processing apparatus (electronic device) 2 has a main body 3 and a display 4, the main body 3 including a control board (not shown in the drawing) on which a CPU and a memory are mounted, the display 4 being provided with a liquid crystal panel. The main body 3 and the display 4 are connected by a hinge 5 such that the main body 3 and the display 4 are folded together to enhance portability.

A keyboard 6 and a touch pad 7 are provided in an upper surface 8a of a case 8 of the main body 3. A drive bay or a housing space in which a peripheral, such as an optical disk apparatus, is replaceably housed is provided on a rear side of the keyboard 6 of the case 8 of the main body 3. The image display apparatus 1 is attached to the drive bay.

The image display apparatus 1 has a case 11 and a portable body 12 insertable to and removable from the case 11. The portable body 12 includes an optical engine unit (projection unit) 13 and a control unit (support unit) 14, the optical engine unit 13 housing optical components to project a screen image 16 on a screen 15, the control unit 14 housing a board that controls the optical components in the optical engine unit 13.

Figures 1, 12A:
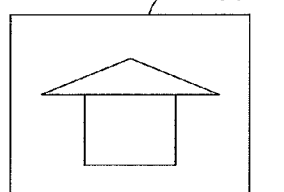
Figures 2, 12A:
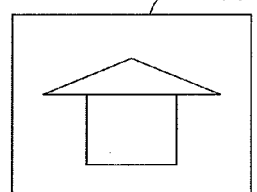

FIG. 2 schematically illustrates a configuration of an optical engine 21 installed in the optical engine unit 13. The optical engine 21 has a green color laser light source apparatus 22 emitting green color laser light; a red color laser light source apparatus 23 emitting red color laser light; a blue color laser light source apparatus 24 emitting blue color laser light; an LCD-reflective light modulator 25 modulating the laser light emitted from each of the laser light source apparatuses 22 to 24, according to image signals; a polarization beam splitter 26 reflecting the laser light emitted from each of the laser light source apparatuses 22 to 24 and radiating the light onto the light modulator 25, and transmitting the modulated laser light emitted from the light modulator 25; a relay optical system 27 guiding the laser light emitted from each of the laser light source apparatuses 22 to 24 to the polarization beam splitter 26; and a projection optical system 28 projecting on the screen the modulated laser light that has transmitted the polarization beam splitter 26.

The optical engine 21 displays a color image in a commonly-called field sequential system. Laser light having respective colors is sequentially emitted from the respective laser light source apparatus 22 to 24 on a time division basis. Images of the laser light having respective colors are recognized as a color image due to a residual image effect.

The relay optical system 27 includes collimator lenses 31 to 33; a first dichroic mirror 34 and a second dichroic mirror 35; a diffuser panel 36; and a field lens 37. The collimator lenses 31 to 33 convert the laser light having respective colors into a parallel beam, the laser light being emitted from the laser light source apparatuses 22 to 24, respectively. The first dichroic mirror 34 and the second dichroic mirror 35 guide the laser light in a predetermined direction, the laser light having passed through the collimator lenses 31 to 33. The diffuser panel 36 diffuses the laser light guided by the dichroic mirrors 34 and 35. The field lens 37 converts the laser light having passed through the diffuser panel 36 into a converging laser.

When a side on which the laser light is emitted from the projection optical system 28 toward the screen is a front side, the blue color laser light is emitted rearward from the blue color laser light source apparatus 24. The green color laser light is emitted from the green color laser light source apparatus 22 and the red color laser light is emitted from the red color laser light source apparatus 23, such that an optical axis of the green color laser light and an optical axis of the red color laser light orthogonally intersect with an optical axis of the blue color laser light. The blue color laser light, the red color laser light, and the green color laser light are guided to the same optical path by the two dichroic mirrors 34 and 35. Specifically, the blue color laser light and the green color laser light are guided to the same optical path by the first dichroic mirror 34; and the blue color laser light, the green color laser light, and the red color laser light are guided to the same optical path by the second dichroic mirror 35.

Each of the first dichroic mirror 34 and the second dichroic mirror 35 is provided with a film on a surface thereof to transmit and reflect laser light having a predetermined wavelength. The first dichroic mirror 34 transmits the blue color laser light and reflects the green color laser light. The second dichroic mirror 35 transmits the red color laser light and reflects the blue color laser light and the green color laser light.

The optical members above are supported by a case 41. The case 41 functions as a heat dissipater dissipating heat generated at the laser light source apparatuses 22 to 24. The case 41 is formed of a high thermal conductive material, such as aluminum or copper.

The green color laser light source apparatus 22 is mounted to a mounting portion 42, which is provided to the case 41 in a state projecting to a side. The mounting portion 42 is provided projecting orthogonal to a side wall portion 44 from a corner portion at which a front wall portion 43 and the side wall portion 44 intersect, the front wall portion 43 being positioned in the front of a housing space of the relay optical system 27, the side wall portion 24 being positioned on the side of the housing space. The red color laser light source apparatus 23 is mounted on an external surface of the side wall portion 44 in a state being held by a holder 45. The blue color laser light source apparatus 24 is mounted on an external surface of the front wall portion 43 in a state being held by a holder 46.

The red color laser light source apparatus 23 and the blue color laser light source apparatus 24 are provided in a commonly-called can package, in which a laser chip emitting laser light is disposed, such that an optical axis is positioned on a central axis of a can-shaped external portion in a state where the laser chip is supported by a stem. The laser light is emitted through a glass window provided to an opening of the external portion. The red color laser light source apparatus 23 and the blue color laser light source apparatus 24 are press-fitted into attachment holes 47 and 48, respectively, which are provided in the holders 45 and 46, respectively. The red color laser light source apparatus 23 and the blue color laser light source apparatus 24 are thus fixed to the holders 45 and 46, respectively. Heat generated by the laser chips of the red color laser light source apparatus 23 and the blue color laser light source apparatus 24 is transferred through the holders 45 and 46, respectively, to the case 41 and dissipated. The holders 45 and 46 are formed of a high thermal conductive material, such as aluminum and copper.

The green color laser light source apparatus 22 includes a semiconductor laser 51; an FAC (fast-axis collimator) lens 52; a rod lens 53; a solid-laser element 54; a wavelength conversion element 55; a concave mirror 56; a glass cover 57; a base 58 supporting the components; and a cover body 59 covering the components. The semiconductor laser 51 emits excitation laser light. The FAC lens 52 is a collecting lens that collects the excitation laser light emitted from the semiconductor laser 51. The solid-laser element 54 emits fundamental laser light (infrared laser light) excited by the excitation laser light. The wavelength conversion element 55 converts the fundamental laser light and emits half wavelength laser light (green color laser light). The concave mirror 56 constitutes a resonator with the solid-laser element 54. The glass cover 57 prevents leak of the excitation laser light and fundamental wavelength laser light.

The base 58 of the green color laser light source apparatus 22 is fixed to the mounting portion 42 of the case 41. A space having a predetermined width (0.5 mm or less, for example) is provided between the green color laser light source apparatus 22 and the side wall portion 44 of the case 41. Thereby, the heat of the green color laser light source apparatus 22 becomes less likely to be transferred to the red color laser light source apparatus 23. The temperature of the red color laser light source apparatus 23 is then prevented from being increased. The red color laser light source apparatus 23, which has undesirable temperature properties, can thus be operated stably. Furthermore, in order to secure a predetermined margin for optical axis adjustment (approximately 0.3 mm, for example) of the red color laser light source apparatus 23, a space having a predetermined width (0.3 mm or more, for example) is provided between the green color laser light source apparatus 22 and the red color laser light source apparatus 23.

FIG. 3 is a schematic view illustrating a state of laser light in the green color laser light source apparatus 22. A laser chip 61 of the semiconductor laser 51 emits excitation laser light having a wavelength of 808 nm. The FAC lens 52 reduces expansion of a fast axis (direction orthogonal to an optical axis direction and along a paper surface of the drawing) of the laser light. The rod lens 53 reduces expansion of a slow axis (direction orthogonal to a paper surface of the drawing) of the laser light.

The solid-laser element 54, which is a commonly-called solid-laser crystal, is excited by the excitation laser light having a wavelength of 808 nm and having passed through the rod lens 53, and emits fundamental wavelength laser light having a wavelength of 1,064 nm (infrared laser light). The solid-laser element 54 is an inorganic optically active substance (crystal) formed of, such as Y (yttrium) and $VO_4$ (vanadate), doped with Nd (neodymium). More specifically, Y of $YVO_4$ as a base martial is substituted and doped with $Nd^{+3}$, which is an element producing fluorescence.

A film 62 is provided to the solid-laser element 54 on a side opposite to the rod lens 53, the film 62 preventing reflection of the excitation laser light having a wavelength of 808 nm and highly reflecting the fundamental wavelength laser light having a wavelength of 1,064 nm and the half wavelength laser light having a wavelength of 532 nm. A film 63 is provided to the solid-laser element 54 on a side opposite to the wavelength conversion element 55, the film 63 preventing refection of the fundamental wavelength laser light having a wavelength of 1,064 nm and the half wavelength laser light having a wavelength of 532 nm.

The wavelength conversion element 55, which is a commonly-called SHG (Second Harmonics Generation) element, converts a wavelength of the fundamental wavelength laser light (infrared laser light) having a wavelength of 1,064 nm emitted from the solid-laser element 54, and generates the half wavelength laser light (green color laser light) having a wavelength of 532 nm.

A film 64 is provided to the wavelength conversion element 55 on a side opposite to the solid-laser element 54, the film 64 preventing reflection of the fundamental wavelength laser light having a wavelength of 1,064 nm and highly reflecting the half wavelength laser light having a wavelength of 532 nm. A film 65 is provided to the wavelength conversion element 55 on a side opposite to the concave mirror 56, the film 65 preventing refection of the fundamental wavelength laser light having a wavelength of 1,064 nm and the half wavelength laser light having a wavelength of 532 nm.

The concave mirror 56 has a concave surface on a side opposite to the wavelength conversion element 55. The concave surface is provided with a film 66 highly reflecting the fundamental wavelength laser light having a wavelength of 1,064 nm and preventing reflection of the half wavelength laser light having a wavelength of 532 nm. Thereby, the fundamental wavelength laser light having a wavelength of 1,064 nm is resonated and amplified between the film 62 of the solid-laser element 54 and the film 66 of the concave mirror 56.

The wavelength conversion element 55 converts a portion of the fundamental wavelength laser light having a wavelength of 1,064 nm entering from the solid-laser element 54, to the half wavelength laser light having a wavelength of 532 nm. A portion of the fundamental wavelength laser light having a wavelength of 1,064 nm which is not converted and transmits the wavelength conversion element 55 is reflected by the concave mirror 56. The reflected fundamental wavelength laser light then re-enters the wavelength conversion element 55 and is converted to the half wavelength laser light having a wavelength of 532 nm. The half wavelength laser light having a wavelength of 532 nm is reflected by the film 64 of the wavelength conversion element 55 and emitted from the wavelength conversion element 55.

A laser beam B1 enters the wavelength conversion element 55 from the solid-laser element 54, is converted to a different wavelength at the wavelength conversion element 55, and is emitted from the wavelength conversion element 55. A laser beam B2 is once reflected by the concave mirror 56, enters the wavelength conversion element 55, is reflected by the film 64, and is emitted from the wavelength conversion element 55. In a state where the laser beam B1 and the laser beam B2 overlap, the half wavelength laser light having a wavelength of 532 nm and the fundamental wavelength laser light having a wavelength of 1,064 nm interfere and thus the output is reduced.

The wavelength conversion element 55 is thus tilted relative to the optical axis direction to prevent the laser beams B1 and B2 from overlapping each other by refraction of an incident surface and an output surface. Thereby, interference is prevented between the half wavelength laser light having a wavelength of 532 nm and the fundamental wavelength laser light having a wavelength of 1,064 nm, and thus the output can be prevented from reducing.

In order to prevent the excitation laser light having a wavelength of 808 nm and the fundamental wavelength laser light having a wavelength of 1,064 nm from leaking externally, a film not transmissive to the laser light is provided on the glass cover 57 shown in FIG. 2.

FIGS. 4A and 4B are each a perspective view of the image display apparatus 1. FIG. 4A illustrates a stored state in which the portable body 12 is stored in the case 11. FIG. 4B illustrates a used state in which the portable body 12 is pulled out from the case 11.

The cases of the optical engine unit 13 and the control unit 14, which are included in the portable body 12, each have a flat box shape having a short height. On two side edges of each of the cases of the optical engine unit 13 and the control unit 14, sliders 71 and 72 are provided along guide rails (not shown in the drawing) provided inside the case 11. Pushing and pulling by a user inserts and removes the portable body 12 to and from the case 11 as shown with an arrow A.

The optical engine unit 13 and the control unit 14 are connected through a hinge 73, such that the optical engine unit 13 is rotatably supported by the control unit 14. The optical engine unit 13 has an emission window 74 in an end portion opposite to the hinge 73. The laser light passing through the projection optical system 28 of the optical engine 21 (refer to FIG. 2) is emitted from the emission window 74.

As shown in FIG. 1, the housing space of the image display apparatus 1 is open to a side surface of the case 8 of the portable information processing apparatus 2, such that the portable body 12 is inserted to and removed from the side surface of the case 8 of the portable information processing apparatus 2 in a substantially orthogonal direction. The case 11 of the image display apparatus 1 is housed in the case 8 of the portable information processing apparatus 2. Portions of the optical engine unit 13 and the control unit 14 project to the side of the case 8 of the portable information processing apparatus 2 during use. The side surface of the portable information processing apparatus 2 is disposed so as to face the screen from the front, and thus the emission window 74 in the optical engine unit 13 faces the screen from the front.

The hinge 73 shown in FIGS. 4A and 4B has an orthogonal biaxial structure. In the used state shown in FIG. 4B, while the control unit 14 is supported by the guide rails of the case 11, the optical engine unit 13 can be completely pulled out from the case 11 so as to be rotated in a vertical direction as shown with an arrow B and in an anteroposterior direction or around the axis in the insertion/removal direction of the portable body 12 as shown with an arrow C.

An operation section 75 is provided in an upper surface of the control unit 14. The operation section 75 includes a power button 76, a brightness switch button 77, and two trapezoidal distortion correction buttons 78 and 79. In addition, a latch lock (not shown in the drawings) is provided inside the case 11 to hold the portable body 12 in a stored position.

Figure 5:
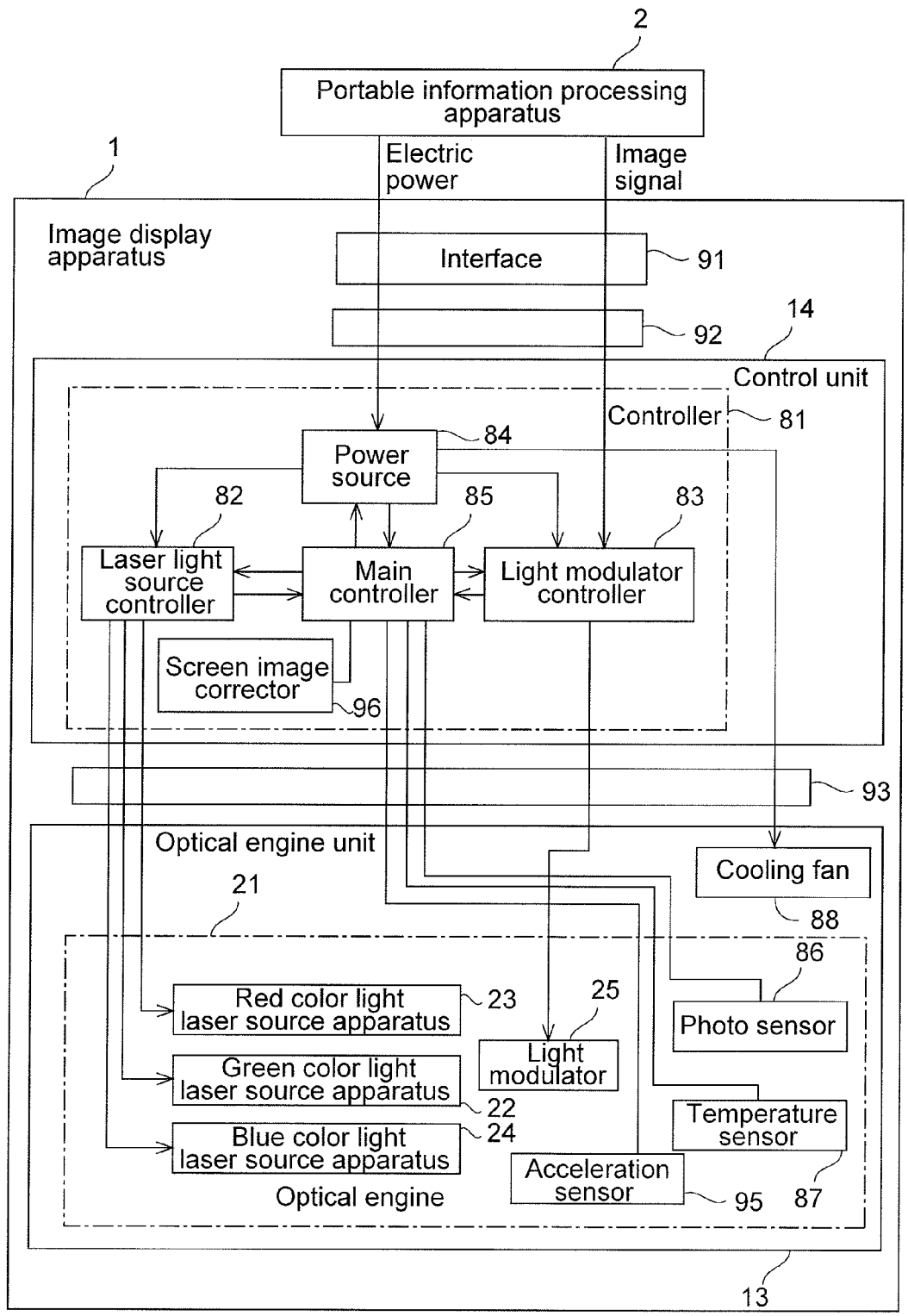
FIG. 5 is a block diagram schematically illustrating a configuration of the image display apparatus.

FIG. 5 is a block diagram schematically illustrating a configuration of the image display apparatus 1. A controller 81 of the image display apparatus 1 has a laser light source controller 82, a light modulator controller 83, a power source 84, and a main controller 85. The laser light source controller 82 controls the laser light source apparatuses 22 to 24 of the respective colors. The light modulator controller 83 controls the light modulator 25 based on image signals input from the portable information processing apparatus 2. The power source 84 supplies power supplied from the portable information processing apparatus 2 to the laser light source controller 82 and the light modulator controller 83. The main controller 85 comprehensively controls the components. The controller 81 is provided in the control unit 14.

In addition to the laser light source apparatuses 22 to 24 of the respective colors and the light modulator 25, the optical engine 21 has a photo sensor 86 and a temperature sensor 87, the photo sensor 86 detecting the light intensity incident to the light modulator 25, the temperature sensor 87 detecting the temperature in the vicinity of the light modulator 25. The optical engine 21 is provided in the optical engine unit 13, which also includes a cooling fan 88 that cools the optical engine 21.

In the case 11 (refer to FIGS. 4A and 4B) of the image display apparatus 1, an interface 91 is provided to which a power supply line and a signal line are connected, the power supply line supplying power from the portable information processing apparatus 2, the signal line transmitting image signals from the portable information processing apparatus 2. The interface 91 and the control unit 14 are connected by a wiring cable 92. The wiring cable 92 is flexible and thus bends and deforms following the control unit 14 when the portable body 12 is inserted to/removed from the case 11.

The control unit 14 and the optical engine unit 13 are connected by a wiring cable 93. The wiring cable 93 includes a signal line and a power supply line, the signal line transmitting and receiving signals between the components in the controller 81 and the components in the optical engine 21, the power supply line supplying power to the cooling fan 88 and the like. The wiring cable 93 is also flexible and thus bends and deforms according to rotation of the optical engine unit 13 when the optical engine unit 13 is rotated relative to the control unit 14.

The controller 81 is provided in the control unit 14 in the embodiment. A portion of the controller 81, such as, for example, the power source 84, may be provided in the case 11 along with the interface 91.

The optical engine 21 in the optical engine unit 13 has an acceleration sensor (projection angle detector) 95. As shown in FIGS. 4A and 4B, the acceleration sensor 95 measures gravity acceleration in two directions, which are a direction along the optical axis of projected light emitted from the emission window 74 of the optical engine unit 13 (anteroposterior direction) and a gravity direction (height direction) in the initial state shown in FIG. 4B. Thus, the acceleration sensor 95 obtains a projection angle, specifically a tilt angle of the optical axis of the projected light relative to the horizontal direction.

As shown in FIG. 5, the controller 81 has a screen image corrector 96 that corrects trapezoidal distortion caused in the case where a screen image is projected from an angle relative to a screen. The screen image corrector 96 performs a scaler process (pixel conversion) in which a rectangular output screen image is converted into a trapezoidal shape distorted in an inverted direction of the screen image projected on the screen through decimation or interpolation of pixels. Trapezoidal distortion is corrected based on the tilt angle obtained from output signals from the acceleration sensor 95. The process will be described in detail below.

Figure 6:
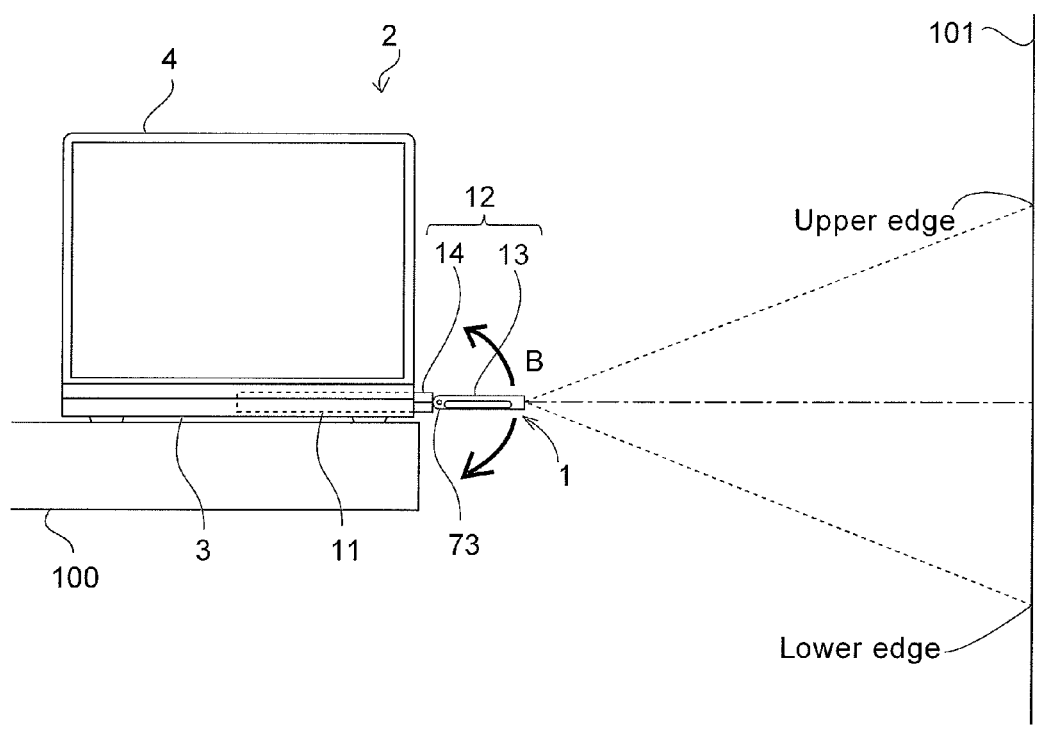
FIG. 6 is a side view illustrating a state in which the portable information processing apparatus is placed on a stand and a screen image is projected from the image display apparatus straight from a side thereof to a wall as a screen.
Figure 7:
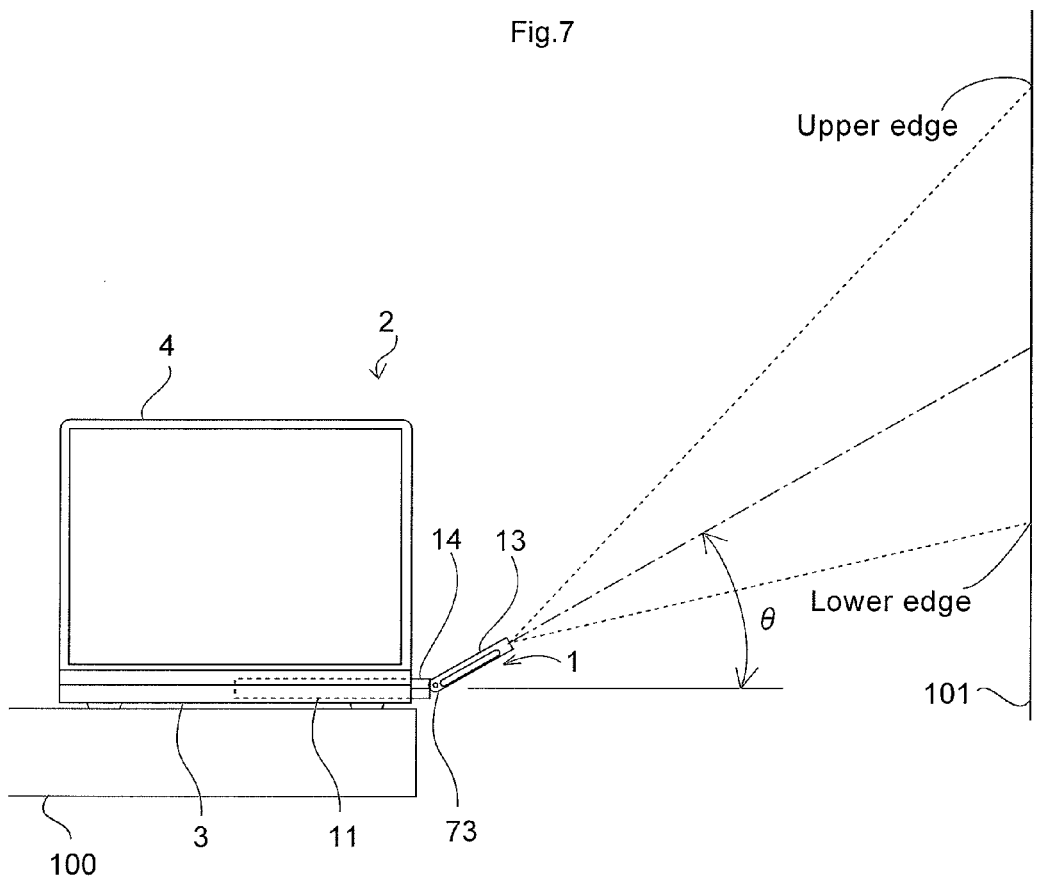
FIG. 7 is a side view illustrating a state in which a screen image is projected obliquely upward to the wall as a screen.
Figure 8:
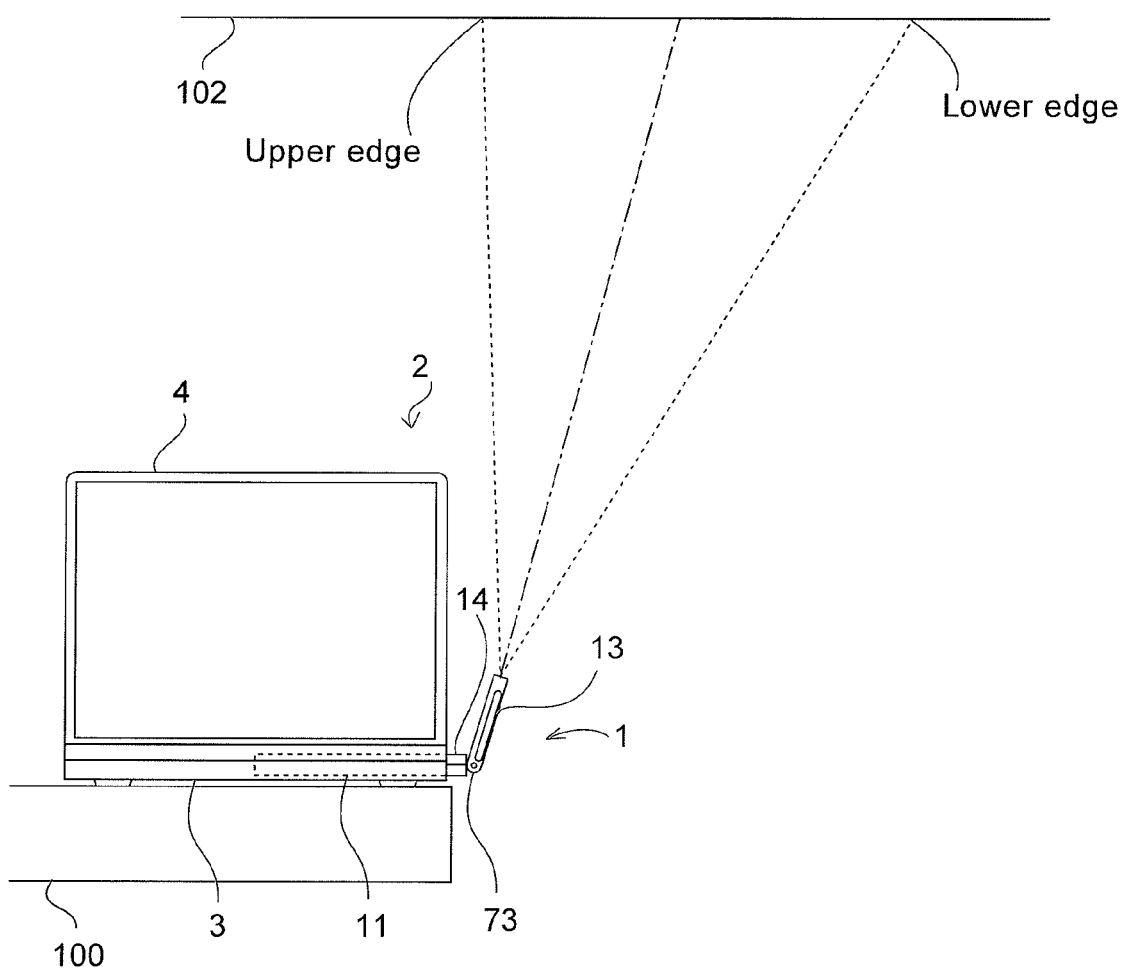
FIG. 8 is a side view illustrating a state in which a screen image is projected obliquely upward to a ceiling as a screen.
Figure 9:
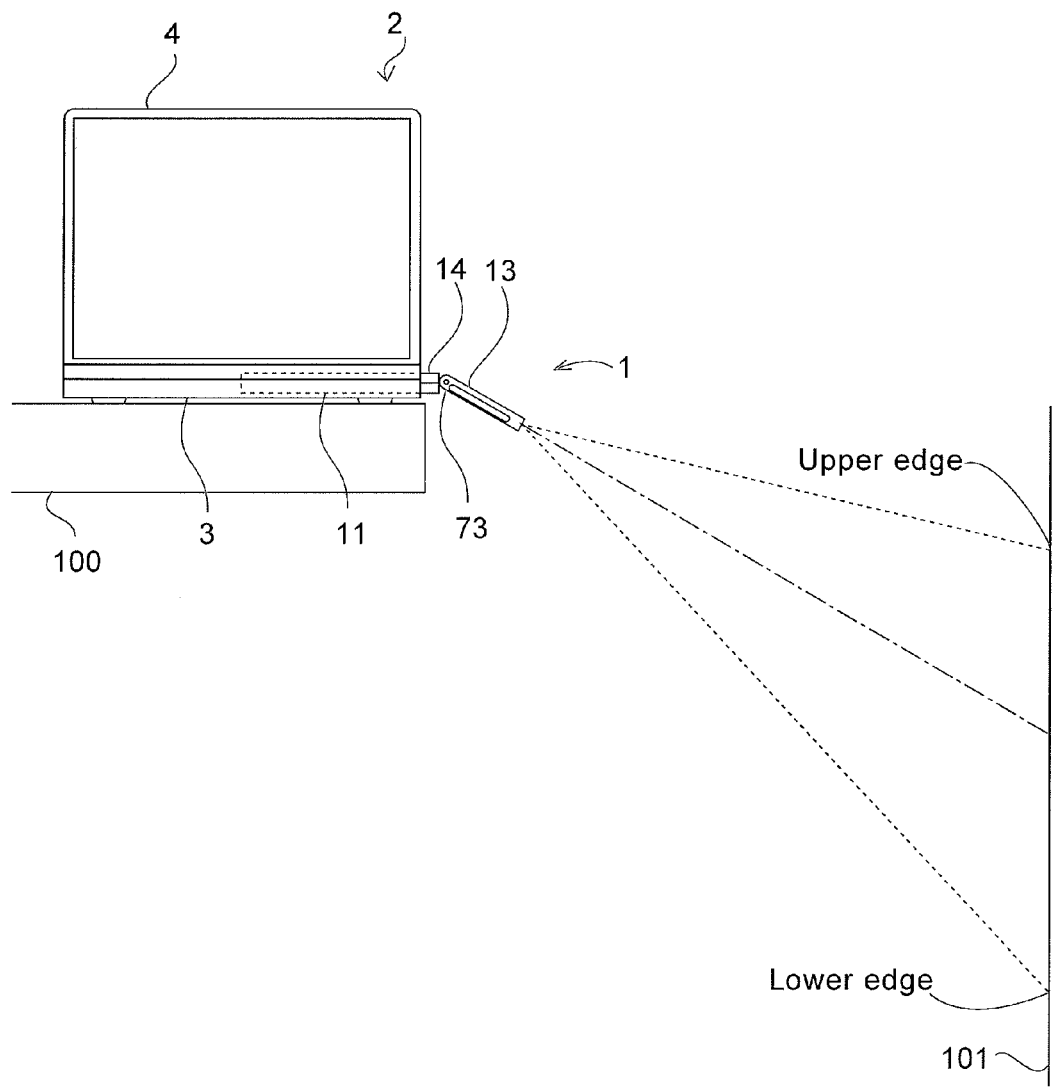
FIG. 9 is a side view illustrating a state in which a screen image is projected obliquely downward to the wall as a screen.
Figure 10:
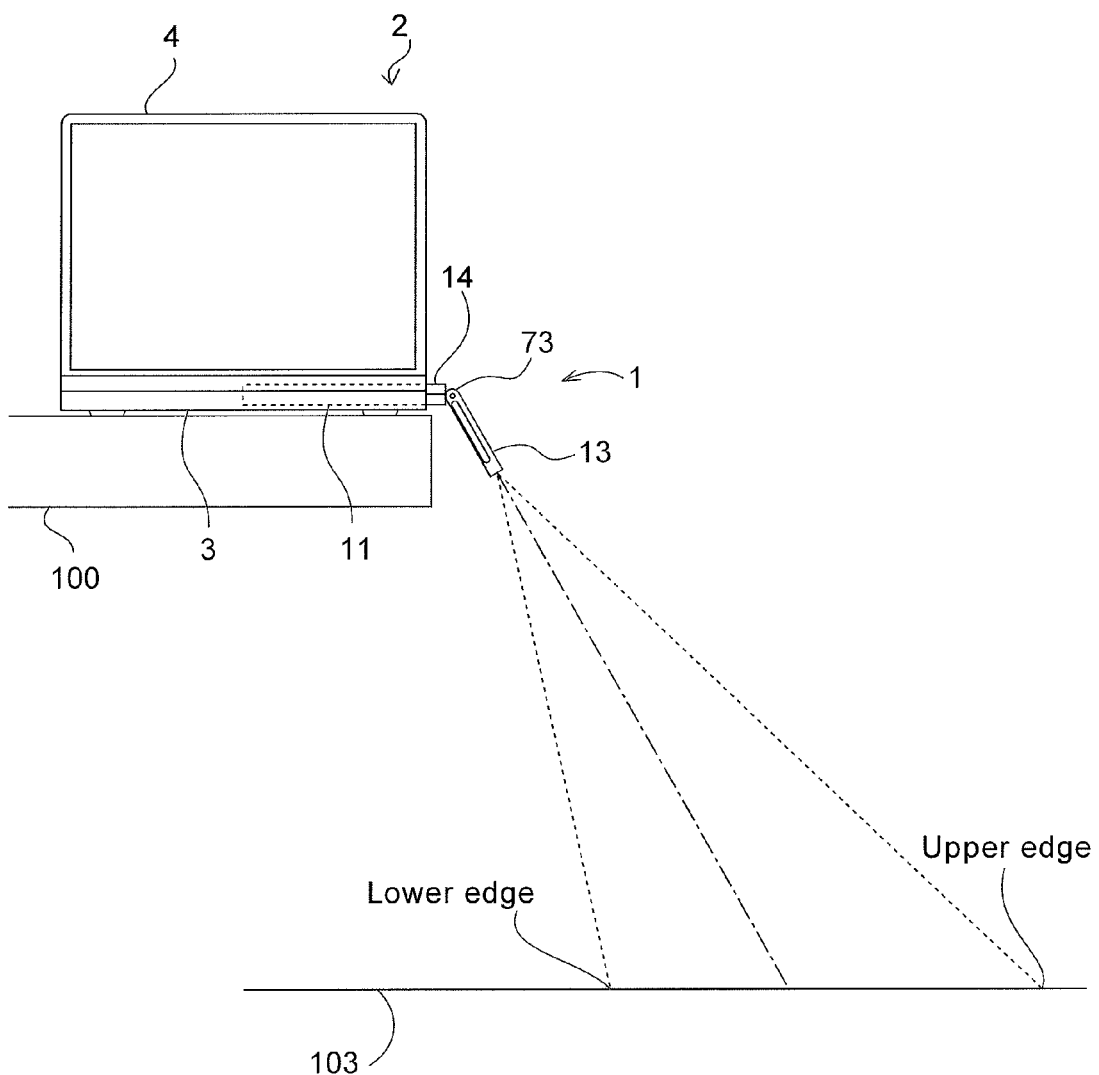
FIG. 10 is a side view illustrating a state in which a screen image is projected obliquely downward to a floor as a screen.

FIG. 6 is a side view illustrating a state in which the portable information processing apparatus 2 is placed on a stand 100 and a screen image is projected from the image display apparatus 1 straight from a side thereof to a wall 101 as a screen. FIG. 7 is a side view illustrating a state in which a screen image is projected obliquely upward to the wall 101 as a screen. FIG. 8 is a side view illustrating a state in which a screen image is projected obliquely upward to a ceiling 102 as a screen. FIG. 9 is a side view illustrating a state in which a screen image is projected obliquely downward to the wall 101 as a screen. FIG. 10 is a side view illustrating a state in which a screen image is projected obliquely downward to a floor 103 as a screen.

As shown in FIG. 6, the optical engine unit 13 is vertically rotatably supported, as shown with the arrow B, by the control unit 14. Rotating the optical engine unit 13 adjusts the projection angle. In the embodiment in particular, the optical engine unit 13 can be rotated by 90° upward and downward from a neutral position in an initial state shown in FIG. 6. Changing the projection angle in a range from −90° to +90° allows projection upward to the wall, to the ceiling, downward to the wall, and to the floor, as shown in FIGS. 7 to 10.

In the case of projecting a screen image straight to the side on the wall 101 as the screen as shown in FIG. 6, the distance to the wall 101 is equal at the upper edge and the lower edge of the projected screen image. Thus, the projected screen image is displayed on the wall 101 in a non-distorted rectangular shape having the upper edge and the lower edge in the same length. In the case of projecting a screen image obliquely relative to the wall 101, the ceiling 102, or the floor 103, as shown in FIGS. 7 to 10, the distance to the wall 101, the ceiling 102, or the floor 103 is different between the upper edge and the lower edge of the projected screen image. Thus, the rectangular output screen image is displayed on the wall 101, the ceiling 102, or the floor 103 in a trapezoidal shape having the upper edge and the lower edge in different lengths, requiring trapezoidal distortion correction.

FIG. 11 illustrates a relationship between a projection angle and a correction factor according to the present invention. The projection angle θ is the tilt angle of the optical axis of the projected light relative to the horizontal direction, the projected light being emitted from the emission window 74 of the optical engine unit 13 (refer to FIG. 7). The projection angle θ is 0 with the optical axis of the projected light in the horizontal direction; is positive at an elevation angle where the optical engine unit 13 is rotated upward; and is negative at a depression angle where the optical engine unit 13 is rotated downward.

The screen image corrector 96 shown in FIG. 5 corrects trapezoidal distortion using the correction factor shown in FIG. 11. In the embodiment, an amount of trapezoidal distortion correction is changed according to the projection angle indicated by an output value of the acceleration sensor 95. Based on the projection angle, a projection mode is determined from among projection upward on the wall, projection on the ceiling, projection downward on the wall, and projection on the floor. According to the projection mode, a direction of trapezoidal distortion correction is changed.

The correction factor represents a ratio of the upper edge and the lower edge of the projected screen image displayed in a trapezoidal shape. With a projection angle θ of 0, specifically projection of a screen image straight to the side, the correction factor is 1 and trapezoidal distortion correction is not performed. The correction factor increases as the projection angle θ increases, and the amount of trapezoidal distortion correction increases according to the increase in the projection angle θ. Thus, screen image distortion which is more remarkable with the increase in the projection angle θ can be appropriately corrected.

The sign preceding the correction factor defines the direction of trapezoidal distortion correction. A positive sign represents compression on the upper edge portion of the screen image, and a negative sign represents compression on the lower edge portion of the screen image. According to the sign of the correction factor determined by the projection mode, the upper edge portion or the lower edge portion of the screen image is compressed. Specifically, in the case of projection upward on the wall and projection on the floor, the correction factor is positive and the upper edge portion of the screen image is compressed. In the case of projection on the ceiling and projection downward on the wall, the correction factor is negative and the lower edge portion of the screen image is compressed.

The projection mode is determined at the projection angle θ of 45° for projection upward on the wall and projection on the ceiling and at the projection angle θ of −45° for projection downward on the wall and projection on the floor. Thus, the projection angle θ between 0° and 45° is determined as projection upward on the wall; the projection angle θ between 45° and 90° is determined as projection on the ceiling; the projection angle θ between −45° and 0° is determined as projection downward on the wall; and the projection angle θ between −90° and −45° is determined as projection on the floor. The reference projection angle to determine the projection mode is not limited as above and may be determined as desired.

To correct trapezoidal distortion, the upper edge portion or the lower edge portion of the screen image is compressed in the embodiment. A method of correcting trapezoidal distortion is not limited to this. As long as a projected screen image displayed on the screen is corrected so as not to be distorted, a variety of publicly known methods may be employed.

The trapezoidal distortion correction buttons 78 and 79 shown in FIGS. 4A and 4B are provided to manually correct trapezoidal distortion. For example, in the case where a projected screen image is still distorted after having undergone automatic trapezoidal distortion correction based on the projection angle, the screen image can be finely tuned to correct trapezoidal distortion.

Figures 1, 12B:
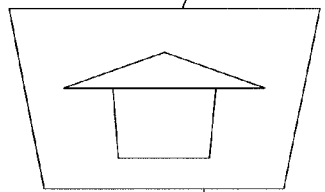
Figures 2, 12B:
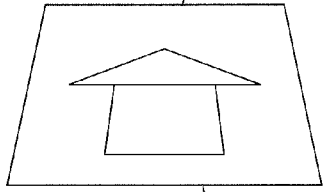

FIGS. 12A-1, 12B-1, 12C-1, and 12D-1 each illustrate a screen image projected upward to the wall or projected to the floor; FIGS. 12A-2, 12B-2, 12C-2, and 12D-2 each illustrate a screen image projected to the ceiling or projected downward to the wall. In projection upward to the wall shown in FIG. 7, the distance to the wall 101 is greater on the upper edge of the projected screen image. In projection to the floor shown in FIG. 10, the distance to the floor 103 is also greater on the upper edge of the projected screen image, similar to the projection upward to the wall. Thus, in the case of projection upward to the wall and to the floor, the rectangular output screen image shown in FIG. 12A-1 projected as-is on the wall 101 and the floor 103 is displayed in a trapezoidal shape having the upper edge longer than the lower edge as shown in FIG. 12B-1.

Figures 1, 12C:
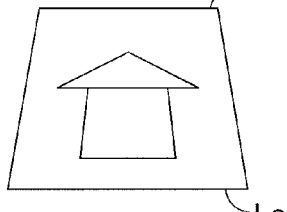
Figures 2, 12C:
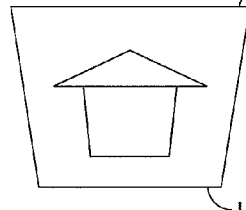
Figures 1, 12D:
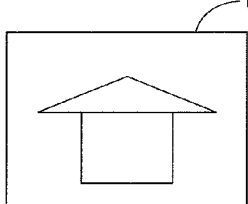
Figures 2, 12D:
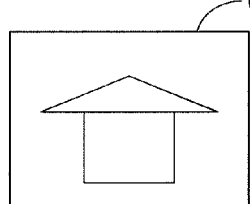

In trapezoidal distortion correction using the correction factor shown in FIG. 11, the correction factor is positive for projection upward to the wall and to the floor, and thus the upper edge portion of the screen image is compressed. The corrected output screen image has a trapezoidal shape having the upper edge shorter than the lower edge, as shown in FIG. 12C-1. Thus, the screen image projected on the wall 101 or the floor 103 has a rectangular screen image with no distortion having the upper edge and the lower edge in the same length, as shown in FIG. 12D-1.

In projection to the ceiling shown in FIG. 8, the distance to the ceiling 102 is greater on the lower edge of the projected screen image. In projection downward to the wall shown in FIG. 9, the distance to the wall 101 is also greater on the lower edge of the projected screen image, similar to the projection to the ceiling. Thus, in the case of projection to the ceiling and downward to the wall, the rectangular output screen image shown in FIG. 12A-2 projected on the ceiling 102 and the wall 101 is displayed in a trapezoidal shape having the lower edge longer than the upper edge as shown in FIG. 12B-2.

In trapezoidal distortion correction using the correction factor shown in FIG. 11, the correction factor is negative for projection to the ceiling and downward to the wall, and thus the lower edge portion of the screen image is compressed. The corrected output screen image has a trapezoidal shape having the lower edge shorter than the upper edge, as shown in FIG. 12C-2. Thus, the screen image projected on the ceiling 102 and the wall 101 has a rectangular screen image with no distortion having the upper edge and the lower edge in the same length, as shown in FIG. 12D-2.

Figure 13A:
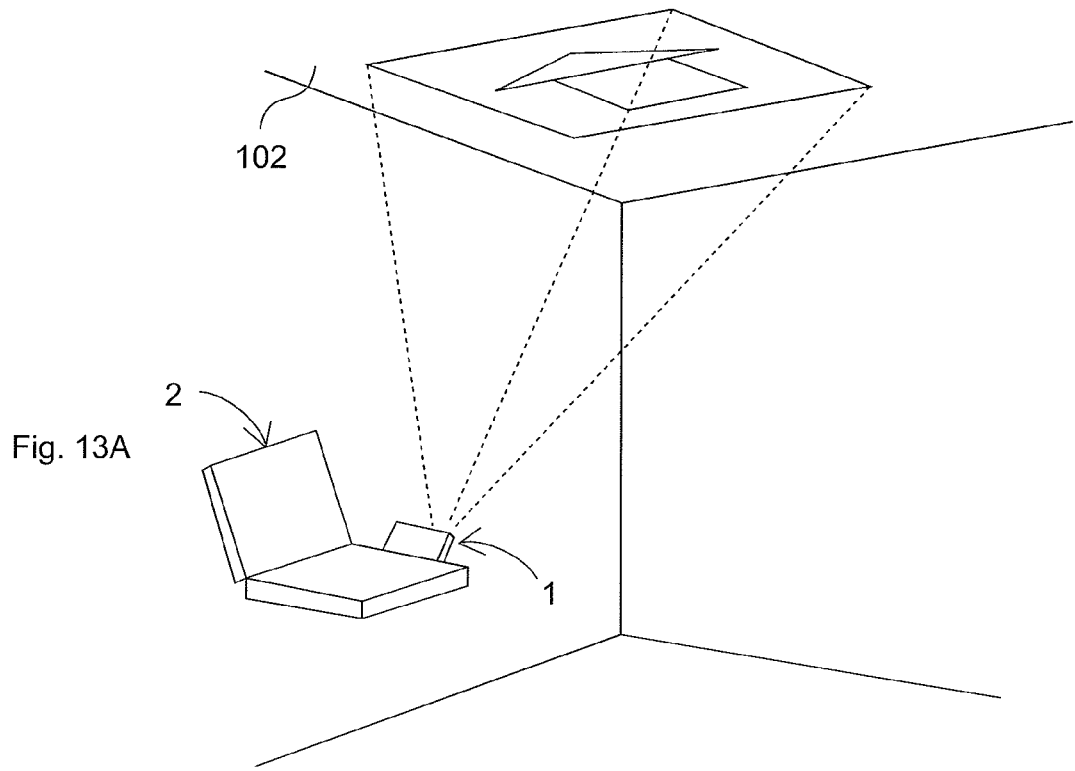
FIGS. 13A and 13B are each a perspective view illustrating an example in which a screen image is displayed in reverse in the case of ceiling projection.
Figure 13B:
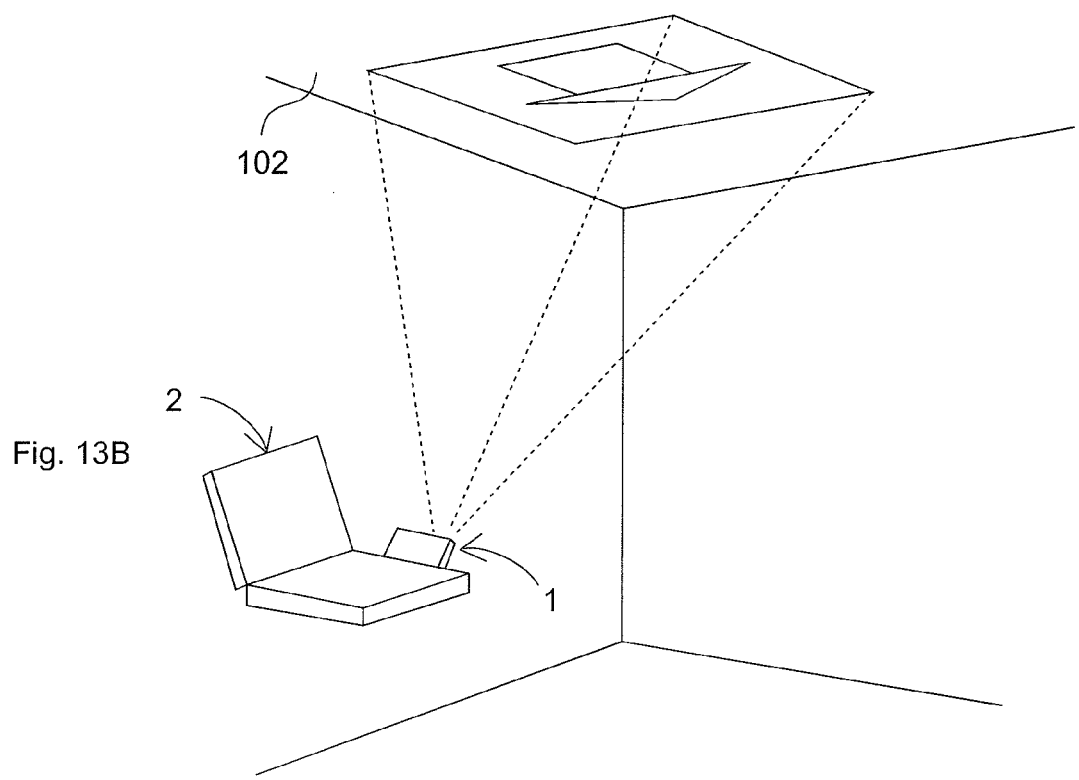

FIGS. 13A and 13B are each a perspective view illustrating an example in which an screen image is displayed in reverse in a case of ceiling projection. Merely correcting trapezoidal distortion in the case of ceiling projection shown in FIG. 8 provides a screen image as shown in FIG. 13A on the ceiling 102. Depending on a positional relationship between a user looking up to the ceiling 102 and the screen image, the screen image appears upside down. In this case, reversing the screen image as shown in FIG. 13B improves viewability. Similarly, reversing the screen image improves viewability in some cases of floor projection shown in FIG. 10.

Thus, when determining projection on the ceiling or the floor based on the projection angle indicated by the output value of the acceleration sensor 95, the screen image corrector 96 corrects trapezoidal distortion of a screen image and reverses the screen image upside down.

Figure 14:
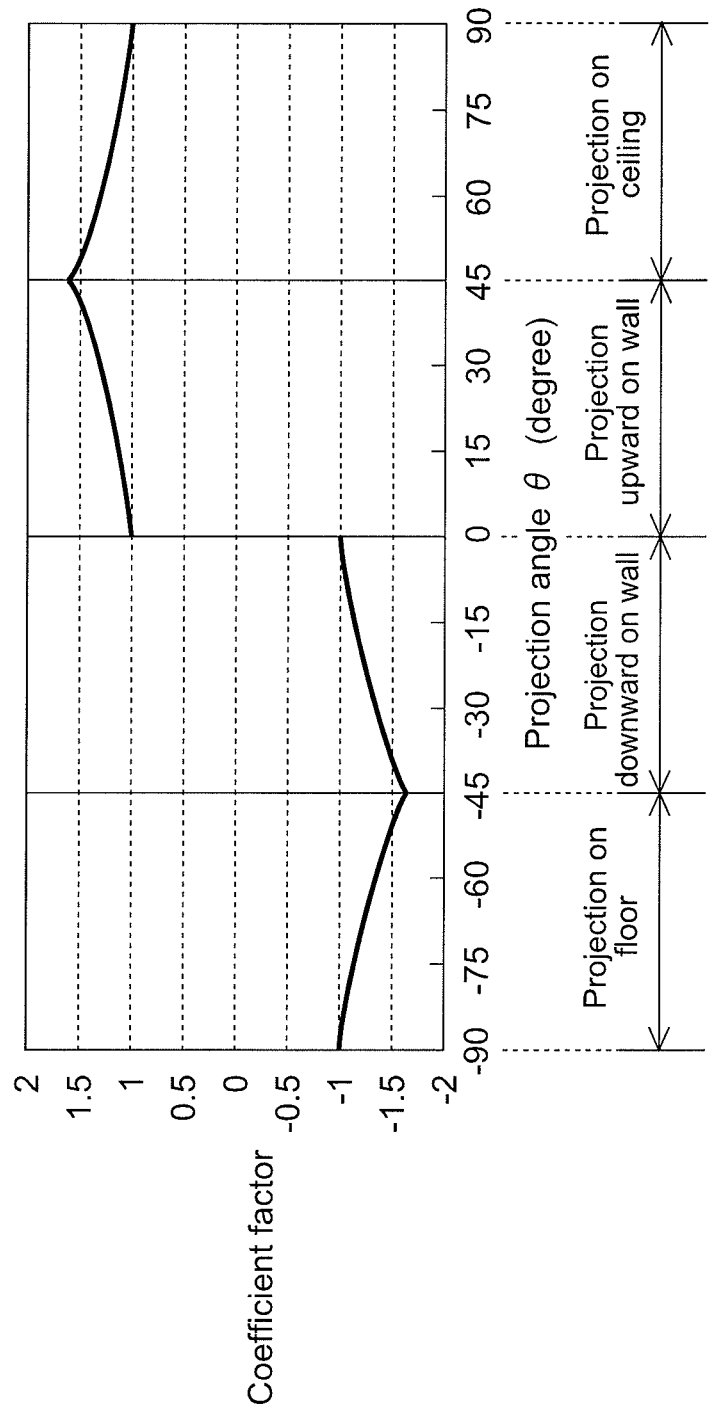
FIG. 14 illustrates a relationship between a projection angle and a correction factor in the case of reverse display of a screen image.

FIG. 14 illustrates a relationship between the projection angle and the correction factor in the case of reverse display of a screen image. A screen image displayed in reverse in ceiling projection or floor projection has a reverse positional relationship of the upper edge and the lower edge. Thus, trapezoidal distortion is corrected in a reverse manner of the example in FIG. 11. Specifically, in the case of ceiling projection, the correction factor is positive and the upper edge portion of the screen image is compressed for correction, while in the case of floor projection, the correction factor is negative and the lower edge portion of the screen image is compressed for correction.

Figures 1, 15A:
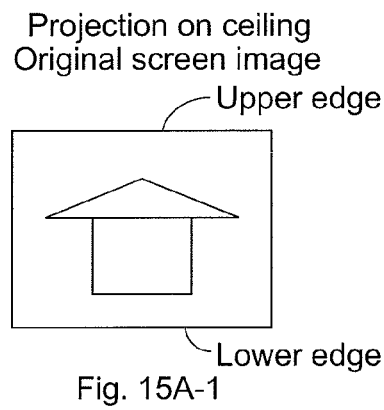
Figures 2, 15A:
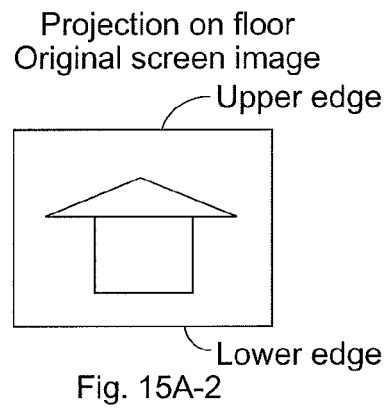
Figures 1, 15B:
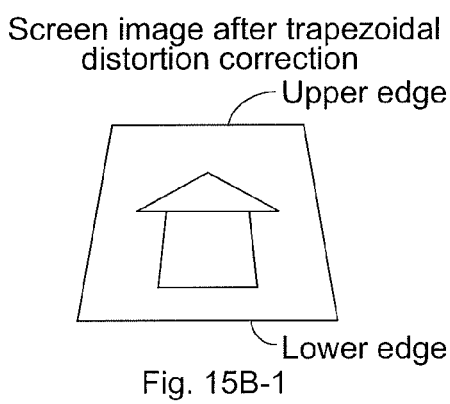
Figures 2, 15B:
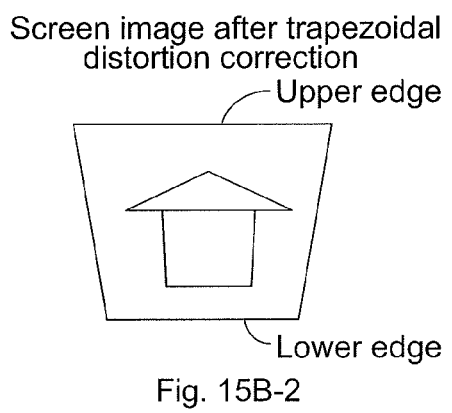
Figures 1, 15C:
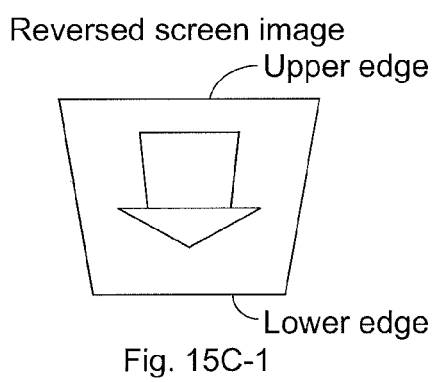
Figures 2, 15C:
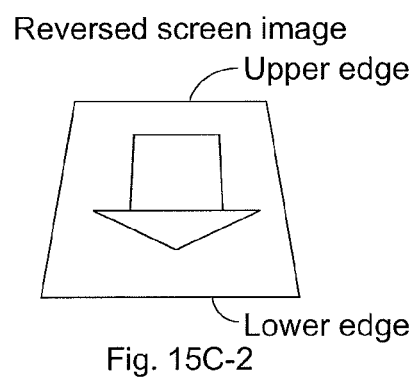
Figures 1, 15D:
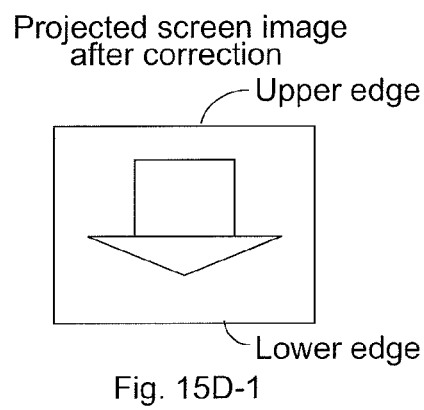
Figures 2, 15D:
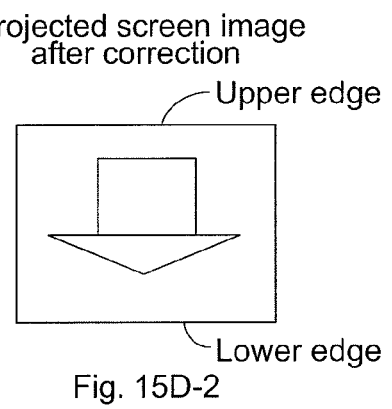
Figure 16A:
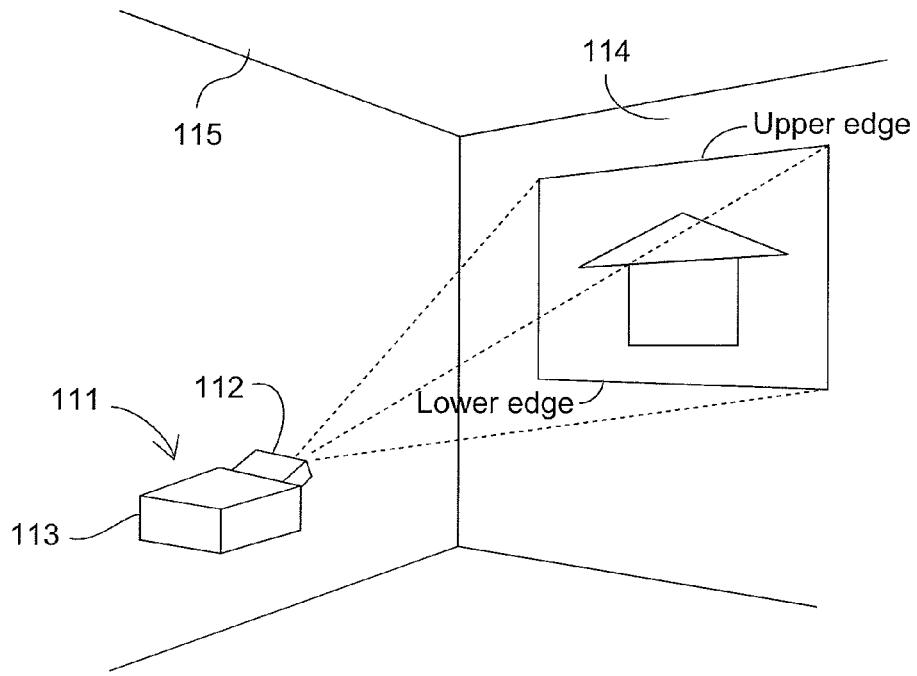
FIG. 16A is a perspective view illustrating projection upward to the wall.
Figure 16B:
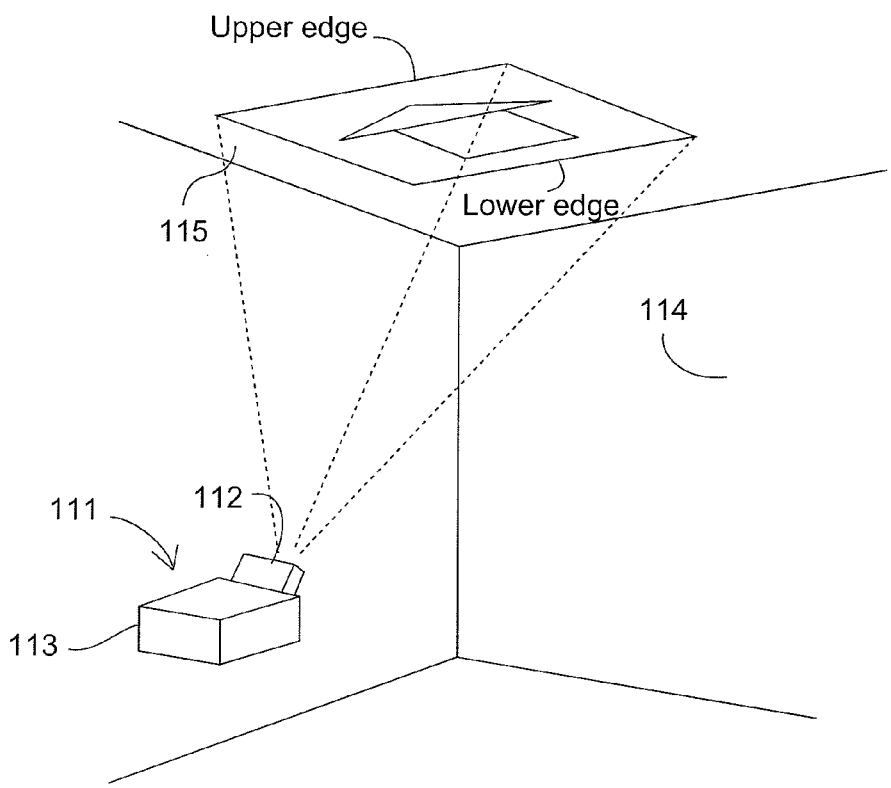
FIG. 16B is a perspective view illustrating projection to the ceiling.
Figure 17:
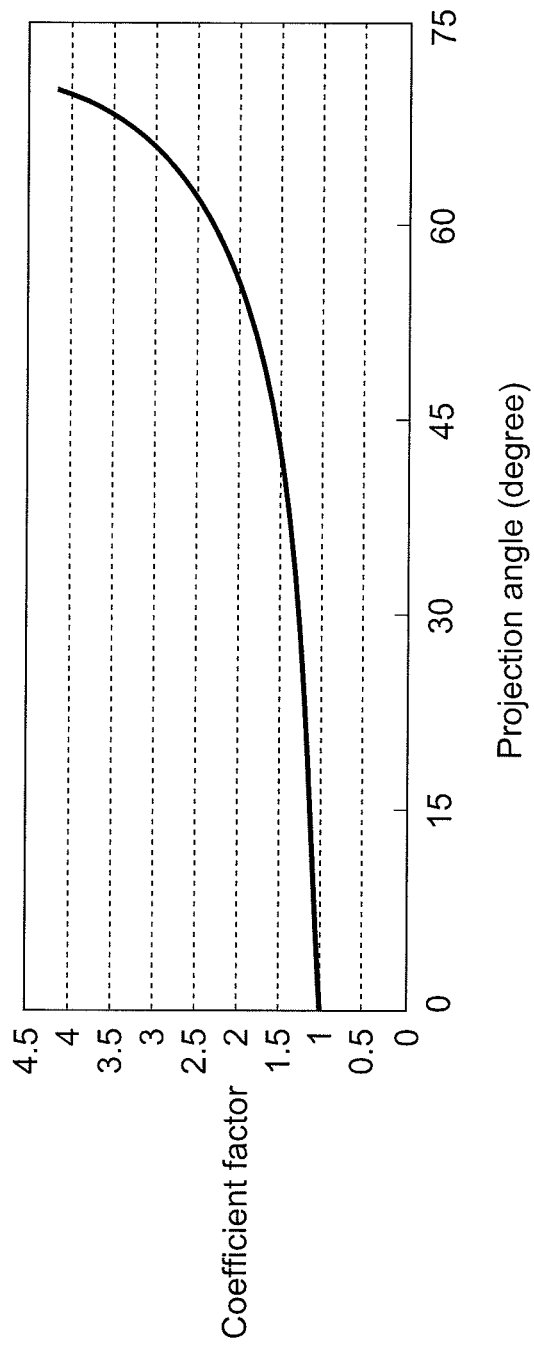
FIG. 17 illustrates an example of a relationship between a projection angle and a correction factor according to a conventional configuration.
Figures 1, 18A:
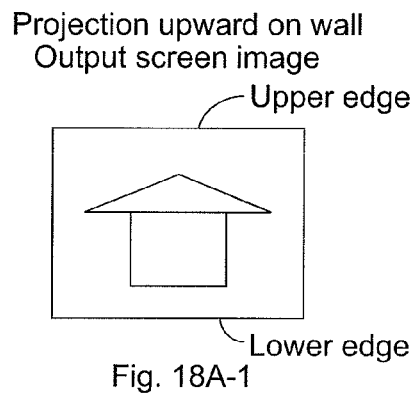
Figures 2, 18A:
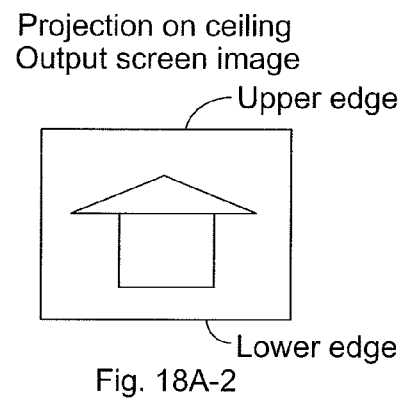
Figures 1, 18B:
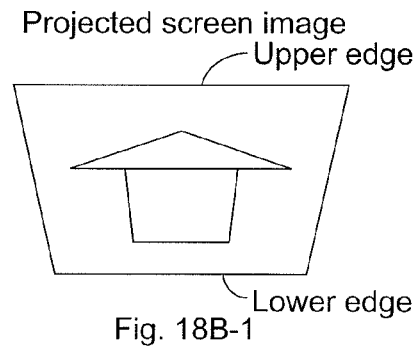
Figures 2, 18B:
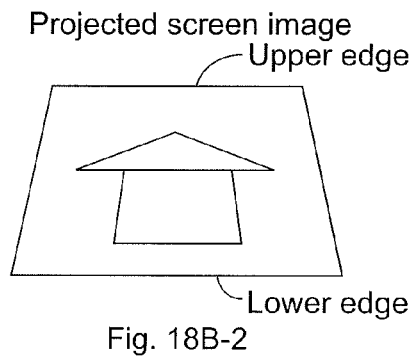
Figures 1, 18C:
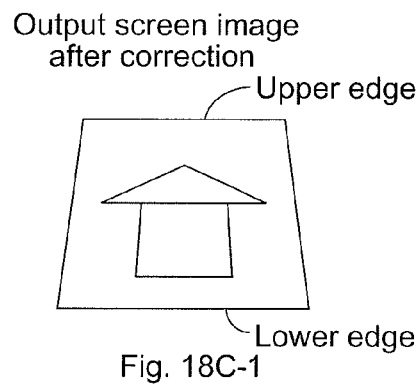
Figures 2, 18C:
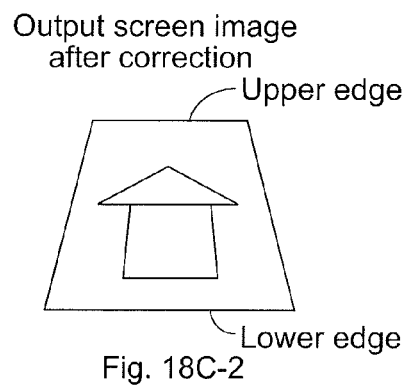
Figures 1, 18D:
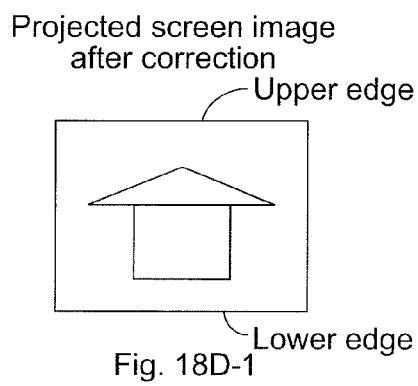
Figures 2, 18D:
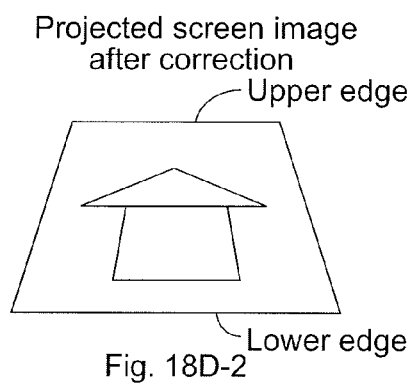

FIGS. 15A-1, 15B-1, 15C-1, and 15D-1 each illustrate a screen image projected to the ceiling; FIGS. 15A-2, 15B-2, 15C-2, and 15D-2 each illustrate a screen image projected to the floor. In the case of ceiling projection, the correction factor is positive and the upper edge portion of the screen image is compressed for correction as shown in FIG. 15B-1. Then, the screen image is reversed upside down as shown in FIG. 15C-1. When the obtained output screen image is projected on the ceiling 102, an upside-down rectangular screen image is displayed with no distortion as shown in FIG. 15D-1.

Meanwhile, in the case of floor projection, the correction factor is negative and the lower edge portion of the screen image is compressed for correction as shown in FIG. 15B-2. Then, the screen image is reversed upside down as shown in FIG. 15C-2. When the obtained output screen image is projected on the floor 103, an upside-down rectangular screen image is displayed with no distortion as shown in FIG. 15D-2.

The portable body 12 in the embodiment above is composed of the first unit (optical engine unit) housing the optical engine 21 and the second unit (control unit) rotatably supporting the first unit and housing the controller 81. The controller 81 may be housed in the first unit along with the optical engine 21. Alternatively, the controller 81 may be provided in a case of an electronic device in which the image display apparatus 1 is installed and the second unit may be provided simply to support the first unit.

In the embodiment above, the projection angle can be adjusted within a range from −90° to +90° to support four projection modes that include projection upward to the wall, projection to the ceiling, projection downward to the wall, and projection to the floor. The projection angle may be configured to be adjusted only in the positive range from 0° to support two projection modes of projection upward to the wall and projection to the ceiling.

Furthermore, the projection angle may be configured to be adjusted in the further positive side from +90°. In this case, the direction of trapezoidal distortion of the screen image is reversed at +90°. Thus, the correction factor is set separately for two projection modes in ceiling projection. Furthermore, the projection angle may be configured to be adjusted in the further negative side from −90°. In this case, the direction of trapezoidal distortion of the screen image is reversed at −90°. Thus, the correction factor is set separately for two projection modes in floor projection.

In the embodiment above, the screen image is projected on the wall 101, the ceiling 102, and the floor 103. The projection mode of the present invention, which includes projection upward to the wall, projection to the ceiling, projection downward to the wall, and projection to the floor, includes projection to a screen member installed perpendicularly or horizontally along the wall, the ceiling, or the floor, in addition to projection to the actual wall, ceiling, or floor of the room.

A case is described in the embodiment in which the image display apparatus 1 of the present invention is installed in the portable information processing apparatus 2. The image display apparatus 1 may be installed in an electronic device, including a portable information processing device of another type.

In the embodiment above, the image display apparatus 1 of the present invention is housed in the housing space of the portable information processing apparatus 2 so as to be replaceable with an optical disk apparatus. The image display apparatus 1 may be housed in an electronic device, such as a portable information processing device, so as not to be replaced with another device, such as an optical disk apparatus.

In the embodiment above, the projection unit rotatably provided to vertically change the projection angle is the optical engine unit that houses the entirety of the optical engine. The projection unit of the present invention may include at least a projection optical system, which is a portion of the optical engine. For instance, a mirror included in the projection optical system may be used to change the projection angle.

The image display apparatus according to the present invention can automatically correct trapezoidal distortion and appropriately display a screen image even in a case of projecting the screen image on the ceiling as a screen. The image display apparatus is thus effective as an image display apparatus having a function to correct trapezoidal distortion caused in the case where a screen image is projected from an angle relative to the screen.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An image display apparatus projecting a screen image on a screen, the image display apparatus comprising:
   a projection unit capable of changing a projection angle;
   a projection angle detector detecting the projection angle of the projection unit; and
   a screen image corrector correcting trapezoidal distortion of a screen image according to the projection angle detected by the projection angle detector,
   wherein the screen image corrector changes a direction of trapezoidal distortion correction based on the projection angle,
   wherein the screen image corrector determines whether a projection mode is projection upward to a wall or projection to a ceiling based on the projection angle and changes the direction of trapezoidal distortion correction for the projection upward to the wall and the projection to the ceiling, and
   wherein the screen image corrector determines that the projection mode is the projection upward to the wall when the projection angle is less than a predetermined value and that the projection mode is the projection to the ceiling when the projection angle is the predetermined value or greater.

2. The image display apparatus according to claim 1, further comprising:
   a correction button manually adjusting trapezoidal distortion correction, wherein
   the correction button for trapezoidal distortion correction finely adjusts trapezoidal distortion correction after the screen image corrector changes the direction of trapezoidal distortion correction.

3. The image display apparatus according to claim 1, further comprising:
   a support unit vertically rotatably supporting the projection unit; and
   a case housing the projection unit and the support unit, wherein
   portions of the projection unit and the support unit are insertably and removably housed in the case.

4. The image display apparatus according to claim 1,
   wherein the image display apparatus is insertably and removably attached to a drive bay provided in the information processing apparatus.

5. An information processing apparatus having the image display apparatus according to claim 3, the information processing apparatus comprising:
   a case having a side opening, wherein
   the case of the information processing apparatus houses the case of the image display apparatus from the side opening, and
   the portions of the projection unit and the support unit are insertably and removably housed in the case of the information processing apparatus.

6. The information processing apparatus according to claim 5,
   wherein the portions of the projection unit and the support unit project from the side opening of the case of the information processing apparatus in a state of use.

7. An image display apparatus projecting a screen image on a screen, the image display apparatus comprising:
   a projection unit capable of changing a projection angle;
   a projection angle detector detecting the projection angle of the projection unit; and
   a screen image corrector correcting trapezoidal distortion of a screen image according to the projection angle detected by the projection angle detector,
   wherein the screen image corrector changes a direction of trapezoidal distortion correction based on the projection angle,
   wherein the screen image corrector determines whether a projection mode is projection upward to a wall or projection to a ceiling based on the projection angle and changes the direction of trapezoidal distortion correction for the projection upward to the wall and the projection to the ceiling, and
   wherein the screen image corrector corrects the screen image by compressing an upper edge portion thereof in a case of the projection upward to the wall and by compressing a lower edge portion thereof in a case of the projection to the ceiling.

8. An image display apparatus projecting a screen image on a screen, the image display apparatus comprising:
   a projection unit capable of changing a projection angle;
   a projection angle detector detecting the projection angle of the projection unit; and a screen image corrector correcting trapezoidal distortion of a screen image according to the projection angle detected by the projection angle detector, wherein the screen image corrector determines whether a projection mode is projection upward to a wall or projection to a ceiling based on the projection angle, and wherein, in a case of the projection to the ceiling, the screen image corrector corrects the screen image by compressing a lower edge portion thereof in a state where the screen image is not displayed in reverse and by compressing an upper edge portion thereof in a state where the screen image is displayed in reverse.

* * * * *